(12) United States Patent
Schwankhart

(10) Patent No.: US 6,353,200 B2
(45) Date of Patent: Mar. 5, 2002

(54) METHOD FOR THE PARTIAL FUSION OF OBJECTS

(75) Inventor: Gerhard Schwankhart, Tuffeltsham (AT)

(73) Assignee: Inocon Technologie Gesellschaft m.b.H., Attnang-Puchheim (AT)

( * ) Notice: Subject to any disclaimer, the term of this patent is extended or adjusted under 35 U.S.C. 154(b) by 0 days.

(21) Appl. No.: 09/779,045

(22) Filed: Feb. 8, 2001

Related U.S. Application Data

(62) Division of application No. 09/294,612, filed on Apr. 19, 1999, now Pat. No. 6,215,088.

(30) Foreign Application Priority Data

May 4, 1998 (AT) .......................................... 286/98 U

(51) Int. Cl.[7] ............................................. B23K 10/00
(52) U.S. Cl. ............................ 219/121.46; 219/121.54; 219/121.57; 219/121.48
(58) Field of Search .................... 219/121.45, 121.46, 219/121.59, 121.54, 121.57, 137 R

(56) References Cited

U.S. PATENT DOCUMENTS

| 3,781,508 A | * | 12/1973 | Dauer et al. ............ 219/121.54 |
| 5,383,980 A | * | 1/1995 | Melber et al. ......... 219/121.59 |
| 5,513,087 A | * | 4/1996 | Kay ....................... 219/121.57 |

* cited by examiner

Primary Examiner—Mark Paschall
(74) Attorney, Agent, or Firm—Collard & Roe, P.C.

(57) ABSTRACT

A method for locally heating objects, in particular thin sheet metal, by charging the objects by means of a plasma ignited between two electrodes. In order to keep the thermal stress of a subject as low as possible outside of the zone to be heated it is provided that the machining such as spot welding or burning through a breakthrough occurs with merely one plasma pulse which is produced by applying a voltage pulse exceeding the arc-over voltage of the gap between the electrodes.

3 Claims, 6 Drawing Sheets

METHOD FOR THE PARTIAL FUSION OF OBJECTS

CROSS REFERENCE TO RELATED APPLICATION

This is a division of U.S. patent application Ser. No. 09/294,612, filed Apr. 19, 1999, now U.S. Pat. No. 6,215,588

BACKGROUND OF THE INVENTION

1. Field of the Invention

The invention relates to a method for the partial fusion of objects.

2. Description of the Prior Art

In known such methods a substantially continuously flowing plasma is used, mostly for hardening the surface of objects made of steel.

A laser beam or an electron beam is mostly used for other methods, e.g. for welding, in particular for spot welding thin sheets, or for producing a breakthrough in thinner metallic objects. This leads to the disadvantage, however, that laser welding processes require a very laborious preparation of the parts to be welded, which must be joined with a very high precision in order to enable their welding by means of a laser beam. The same also applies with respect to methods using electron beams. Moreover, the equipment required for performing such methods is very complex in a constructional respect.

SUMMARY OF THE INVENTION

It is the object of the present invention to avoid such disadvantages and to provide a method of the aforementioned kind which allows a simple machining of objects, in particular the production of spot welds or the burning of breakthroughs.

This is achieved in accordance with the invention by machining with merely on plasma pulse, which is produced by applying a voltage pulse exceeding the arc-over voltage of the gap between the electrodes.

As a result of the proposed measures it is possible with relatively roughly prepared parts to join the same by means of spot welding. Measures will substantially suffice as are also required in electric resistance spot welding.

A very high ejection speed of the plasma pulse is secured by the ignition of the arc by exceeding the arc-over voltage of the anode-to-cathode gap, so that this pulse will impinge upon the parts to be welded with a high kinetic energy. The plasma pulses thus produced will reach very high temperatures of 20,000 to 50,000° C. and will cause adequate fusion of the mutually adhering surface areas of the parts to be joined despite a short action period of e.g. $10^{-5}$ to $10^{-0}$ seconds and will thus cause a secure connection.

Machining in a protective gas atmosphere helps avoid the formation of oxide layers on the subjects, with the gas used for the production of the plasma, mostly argon or helium, appropriately being simultaneously used as inert gas.

If the plasma pulse has a duration of about $10^{-5}$ to $10^{-0}$ seconds, preferably $10^{-4}$ to $10^{-1}$ seconds, relatively compact devices or plasma torches may be used which can be operated at a relatively high output over a short period.

For a weld seam from a number of welding spots, the object to be joined are charged with a number os successive plasma pulses while the objects are moved relative to the electrodes and the electrodes are kept at a constant distance from the objects, a repetition frequency of the plasma pulses of 5 to 100 Hz being provided.

In such a device it is possible in a simple way to charge the subject(s) to be machined with a sequence of very short plasma pulses. In the course of charging the capacitor battery the arc-over voltage of the anode-to-cathode gap will be exceeded and thus an arc will be formed through which there will be a discharge of the capacitor battery. The arc will extinguish as soon as the voltage of the capacitor battery drops below the arc drop voltage. As a result of a respective dimensioning of the charging circuit and the discharge circuit of the capacitor battery with respect to the time constants it is possible to determine both the arc duration in each cycle as well as the repetition frequency. The arc which thus burns only very briefly produces plasma pulses which, as a result of the very rapid heating of the ambient gas, exit with a very high speed from the outlet opening of the chamber of the plasma torch and impinge upon the objects to be joined or the object to be provided with a breakthrough and as a result of their high temperatures ensure the fusion or the melt-through of the object(s).

Short pulse durations of the plasma pulses of $10^{-5}$ to $10^{-0}$ seconds for example and a repetition frequency of 7 to 100 Hz are required for the careful treatment of the objects to be machined. As a result of these short operating times of the individual plasma pulses, the thermal stress on the objects is kept low and thus the danger of distorting the mostly very thin or thin-walled objects is substantially avoided.

Initiating even before reaching the arc-over voltage of the anode-to-cathode gap allows keeping the arc duration, and thus the plasma pulses, extremely short without having to make any particularly great efforts concerning a particularly low-resistance arrangement of the discharge circuit of the capacitor battery.

It is principally also possible to also use a technical AC network or a voltage source supplying a high-frequency AC current in conjunction with a phase controller instead of the capacitor battery as a voltage supply for the plasma torch. In this respect it must be ensured in the case of electrodes made of different materials that merely equally polarised half-waves are partly connected through so that voltage pulses with the same polarity are always applied to the different electrodes and substantially the same ratios as in the supply of the plasma torch with DC voltage pulses, like from a capacitor battery for example, are obtained.

In cases in that both are electrodes made from the same material, pulses with different polarity can be applied to each of the two electrodes.

As electrodes which are made of different materials for the purpose of achieving a longer service life are usually charged with the same polarity in plasma torches, the terms "anode" and "cathode" are generally used in the description and the claims.

BRIEF DESCRIPTION OF THE DRAWINGS

The invention will now be explained in closer detail by reference to the enclosed drawing, wherein.

DETAILED DESCRIPTION OF THE PREFERRED EMBODIMENT

Figure 1:
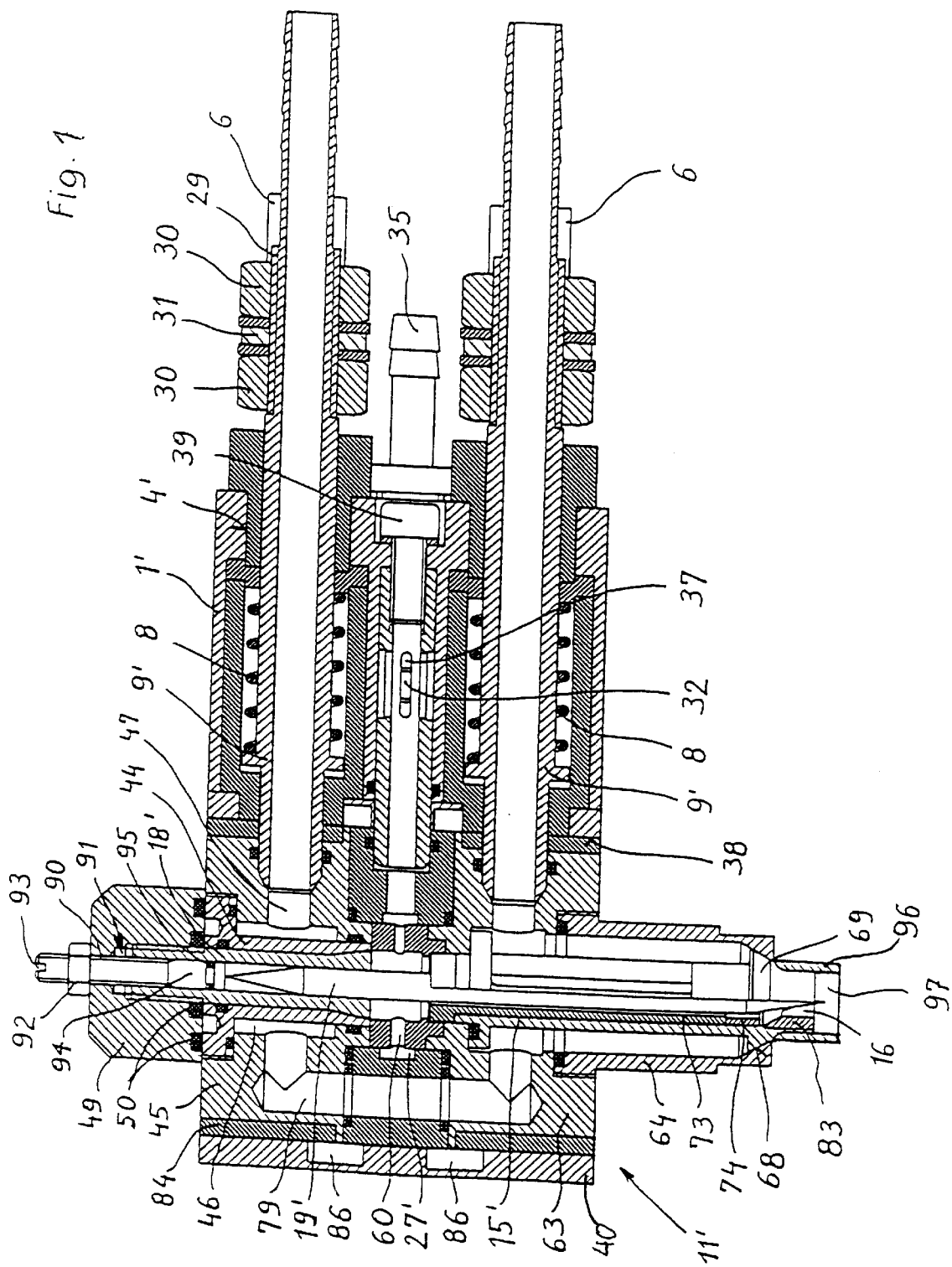
FIG. 1 shows a sectional view through a device with a plasma torch in accordance with the invention.

A holder 1' is provided in the embodiment in accordance with FIG. 1, which holder is provided with bores 4' for receiving contact pins 9', with the contact pins 9' being axially bored through. The contact pins 9' are provided with an outside thread 29 in a zone outside of the holder 1' on which terminal nuts 30 are screwed and between which cable lugs 31 of connecting lines 6 (FIG. 2) are clamped.

The rear end of the contact pins 9' is arranged for the connection of tubes through which cooling water can be supplied.

Figure 2:
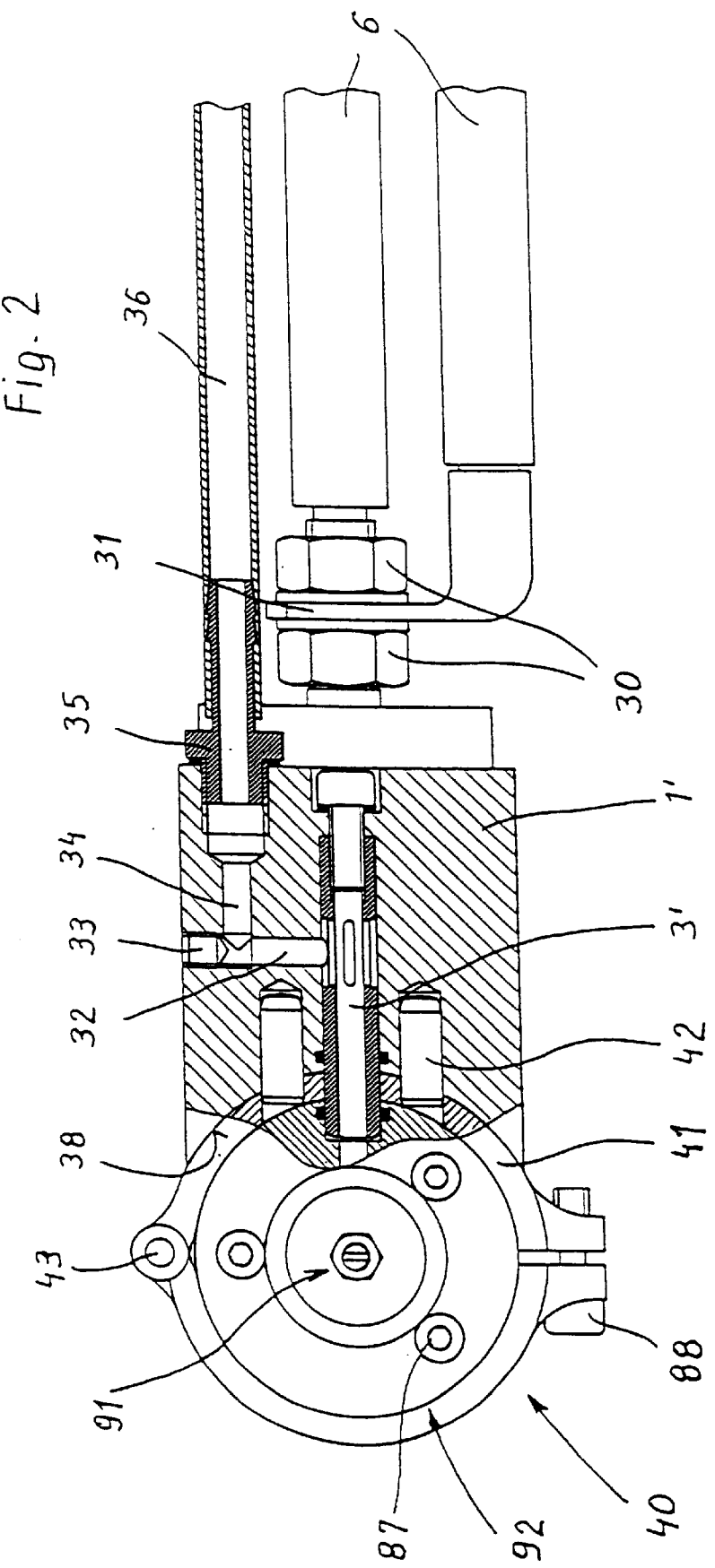
FIG. 2 shows a top view on the holder plus a plasma torch in accordance with FIG. 1.
Figure 3:
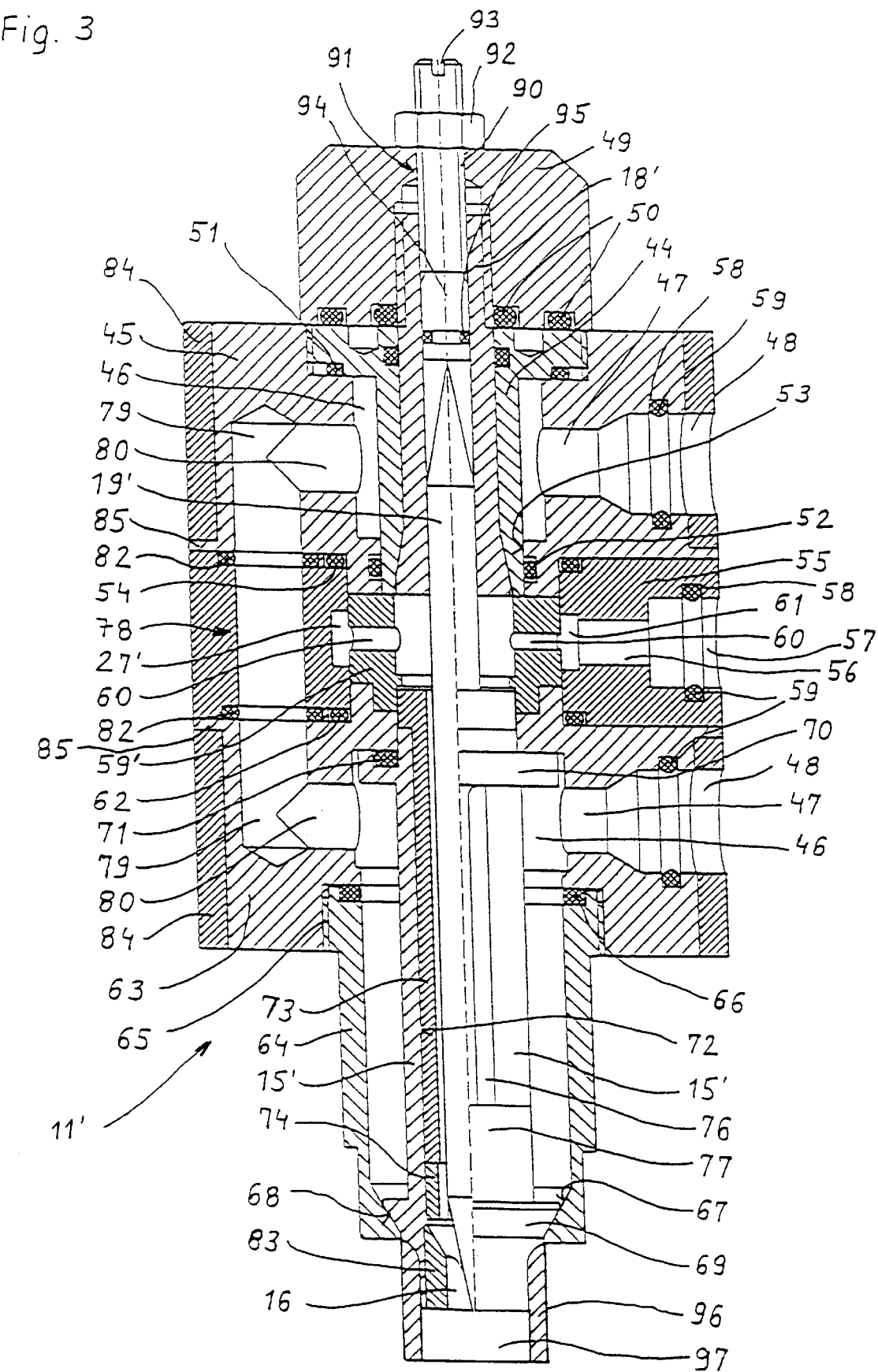
FIG. 3 shows a sectional view through the plasma torch in accordance with FIGS. 1 and 2 on an enlarged scale.

Furthermore, a gas supply line 3' is held in the holder 1' which—as can be seen from FIG. 2—is connected with a gas tube 36 through a radial duct 32 which is outwardly occluded with a grub screw 33 and through an axial bore 34 which opens into the same and into which a hose nozzle 35 is screwed. A gas required for producing the plasma can be supplied through said gas tube.

The gas supply line 3' is provided in the zone of the radial duct 32 with slots 37 through which the gas can flow into the interior of the gas supply line 3'. The gas supply line 3' is secured in its position by means of the screw 39 which engages in the same.

As can be seen from FIG. 1, the contact pins 9' project in their spring-loaded idle position beyond the face surface 38 of the holder 1' and engage in the jacket surface of a plasma producer 11' which is arranged as a module. The same also applies for the gas supply line 3' which, when the plasma producer 11' is mounted, engages in the same.

The plasma producer 11' which is arranged as a module is held by means of a pipe bracket 40 whose rigid part held on the face side 38 of the holder 1' is held with pins 42. Pipe bracket 40 is provided with a joint 43 whose axis extends perpendicularly to the axis of holder 1'.

The holding part 18' of cathode 19' is formed by a collect chuck in plasma producer 11', which chuck is made from an electrically well-conducting material. Said collect chuck is held in the usual manner in a receiver 44 which is screwed into a contact part 45.

Said contact part 45 is provided with a coolant chamber 46 which is connected with a connecting opening 48 through a radial duct 47. Said connecting opening 48 is in true alignment with the contact pins 9' when holder 1' is mounted in plasma producer 11'.

An adjusting nut 49 is provided for tensioning and loosening the collect chuck 18', which adjusting nut rests on the upper face surface of receiver 44 through two seals 50, as a result of which any escape of coolant liquid is prevented. Receiver 44 is also supported on the contact part 45 through a seal 51 for sealing the coolant chamber 46.

An O-ring 52 is provided for further sealing the coolant chamber of the contact part 45, which O-ring is inserted into a groove of a bore 53 which is penetrated by receiver 44.

In order to secure the axial setting of the cathode 19' during the tensioning of the collect chuck 18', adjusting nut 49 is provided with a threaded through-bore 90 into which a stop 91 is screwed which engages into the collect chuck 18'. Said stop 91 is provided with a smooth head 94 in which a circular groove is incorporated for receiving an O-ring 95 which is used for sealing the interior of the collect chuck 18'.

A counternut 92 is provided to secure the position of stop 91 which is adjustable by means of screwdriver which is inserted into the face-sided slot 93. Counternut 92 simultaneously ensures a torsionally rigid connection between the stop 91, on which rests cathode 19', and the adjusting nut 49.

Stop 91 ensures that during the tensioning of the collect chuck cathode 19' can no longer be axially moved with respect to anode 15' by collect chuck 18', because the adjusting nut 49 rests on the face side of contact part 45 and anode 15' is fixed with respect to the same.

Contact part 45, which is used for making the contact of cathode 19', rests on an intermediate part 55 by interposing a seal 54, which intermediate part is made from an electrically insulating material such as ceramic. Said intermediate part 55 determines the chamber 27' which is connected with a connecting opening 57 through a radial duct 56.

The radial ducts 47 and 56 are provided with circular grooves 58 in which O-rings 59 are arranged. They are used for sealing the contact pins 9', which engage in these ducts, and the gas supply line 3'.

A distributor ring 59' is arranged in chamber 27' which is provided with bores 60 which are arranged distributed over the circumference and whose diameters in both directions of rotation increase with an increasing angle towards the radial duct 56. The axial bore of the distributor ring 59' is penetrated by the cathode 19'. An annular space 61 remains between the inner wall of the intermediate part 55 and the distributor ring 59'.

The intermediate part 55 rests on the anode contact part 63 supported through a seal 62. A clamping sleeve 64 is screwed into an inner thread 65 in said anode contact part 63, with a sealing 66 being interposed between the anode contact part 63 and the face surface of the clamping sleeve 64.

The clamping sleeve 64 is provided in the zone of its one end with a conical bearing surface 67 on which rests a diametrically opposed conical jacket surface 68 of a head 69 of an anode 15' which, like the clamping sleeve 64 and the anode contact part 63, is made of an electrically well-conducting material.

Anode 15' is supported with its end averted from head 69 with a further head 70, which by interposing a seal 71 rests on a shoulder of the anode contact part 63. Anode 15' penetrates a coolant chamber 46 of the anode contact part 63.

Anode 15' is bored through in the axial direction, with a sleeve 73 made from an electrically insulating material such as ceramic is disposed on bore 72 and is penetrated by cathode 19'.

Figure 5:
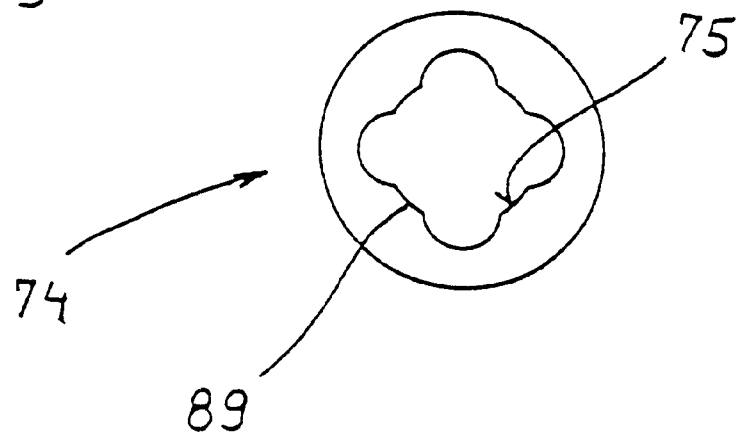
FIG. 5 shows a sectional view through the centering sleeve.

Moreover, a centering sleeve 74 is inserted in bore 72 in the zone close to the orifice of anode 15', which sleeve is illustrated in closer detail in FIG. 5 and whose guide surfaces 75 provided on guide ribs 89 rest on the jacket surface of cathode 19'.

Figure 4:
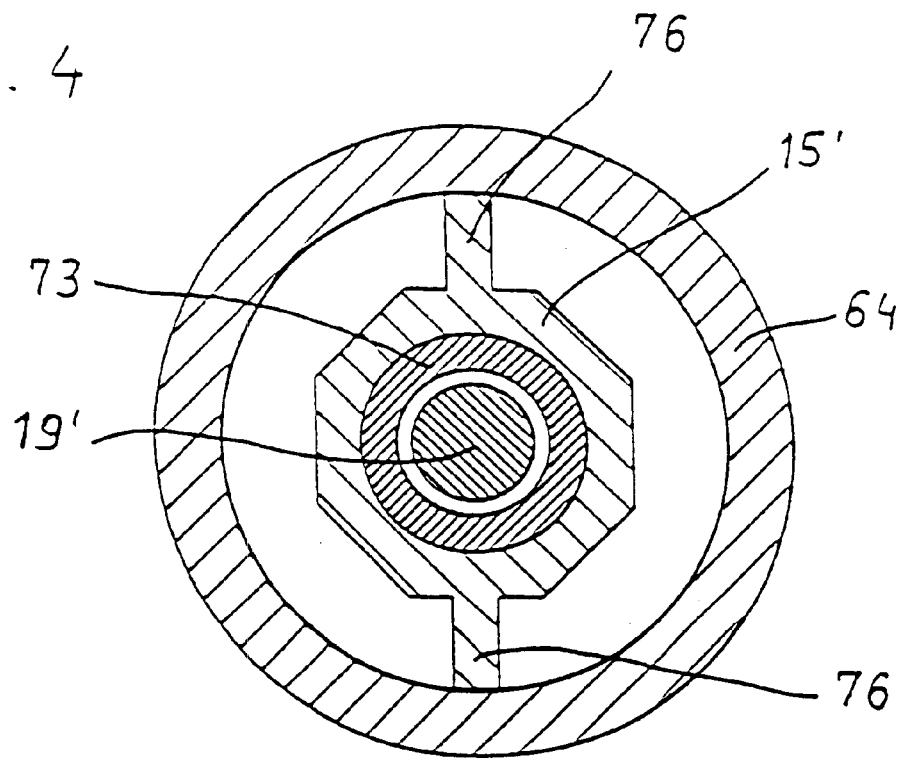
FIG. 4 shows a sectional view through a coolant chamber of the anode contact part.

As is shown in FIG. 4, anode 15' is provided with radially projecting guide ribs 76 which extend from the anode 15' having a hexagonal cross section up to the inner wall of the clamping sleeve 64 and stand perpendicular to the axis of the radial duct 47. Guide ribs 76 extend away from head 70 against the head 69 of anode 15', with a flow gap 77 remaining between the head 69 and the guide ribs 76.

In this way the coolant chamber 46, which is limited on its part by the anode contact part 63 and the clamping sleeve 64, is subdivided by the guide ribs 76.

The two coolant chambers 46 of the contact part 45 and the anode contact part 63 are mutually connected through a transfer duct.

Which is substantially composed of the axial bores 79 in the contact part 45 and the anode contact part 63, respectively, and radial bores 80 which are coaxial to the radial ducts 47 and open into the axial bores 79 bore 78 in intermediate part 55.

Seals 82 are provided in the zone of the bore 81 of the intermediate part 55.

An insert 83 is provided in the orifice zone of anode 15', which insert is made of a wear-resisting materials such as a tungsten-cerium oxide alloy and delimits a nozzle aperture 16. The section of anode 15' projecting from the clamping sleeve 64 is encompassed by a ring 96 which is made of a wear-resistant material and projects axially beyond the nozzle aperture 16 of anode 15' and defines a pre-chamber 97.

The two contact parts 45 and 63 are encompassed by rings 84 made of an electrically insulating material and rest on collars 85.

As can be seen from FIG. 1, the pipe bracket 40 is provided in the zone of the collars 85 of the contact parts 45 and 63 with recesses 86, thus preventing a short between the two contact parts 45 and 63.

Cathode 19' is arranged conically at its two ends.

The two contact parts 45 and 63 and the intermediate part 55 are mutually connected by means of the screws 87 shown in FIG. 2 and represent the connecting parts which thus ensure a modular arrangement of the plasma producer 11'.

As soon as cathode 19' is worn off, the plasma producer 11', which is arranged as a module, can be removed by loosening the straining screw 88 and by opening the pipe bracket 40, whereupon the adjusting nut 49 can be loosened and the cathode 19' can be removed from the collect chuck. Thereafter the cathode can either be turned round or its conical ends can be re-ground. Then the cathode can be adjusted by means of a caliber with respect to anode 15'. Then the stop 91 is adjusted while the collect chuck 18' is opened and the cathode 19' is fixed again in the collect chuck 18' by means of adjusting nut 49, whereupon module 11' can be mounted again.

During the operation a gas such as argon, helium, nitrogen or the like is blown into chamber 27' and an arc between the cathode 19' and the anode 15' is ignited through a voltage pulse which after a brief period of time drops below the arc drop voltage, so that the arc goes out. The plasma pulse thus formed exits through the nozzle aperture 16, passes through pre-chamber 97 and impinges upon the subject(s) to be machined. They are fused by the action of the plasma pulse, thus melting a breakthrough or fusing two subjects to be welded, depending on the energy of the plasma pulse. In the latter case there will be a secure connection of the two parts during the following solidification after the plasma pulse has gone out. In this process these parts are sufficiently pressed together by the kinetic energy of the plasma pulse exiting with a high speed, whereby speeds of 2000 m per second are achieved, thus ensuring a secure connection.

The pre-chamber 97 allows in a very simple way charging the subjects to be machined with plasma pulses under a protective gas atmosphere. For this purpose it is merely necessary to supply the plasma torch 11' with a substantially constant flow of plasma gas such as argon, helium or nitrogen. Nitrogen can only be used if the subject to be machined is compatible with a nitrogen atmosphere in the fused stated.

Furthermore, the plasma torch 11' can be placed on the subject to be machined with the face side of ring 96 during the production of individual welding spots, thus simultaneously defining the distance between the electrodes 15', 19' and the upper side of the subject.

For special applications such as the production of breakthroughs with very small diameters it is possible to provide nozzles 16 with very small diameters, as small as 10 μm for example. As in such plasma torches 11' it is possible to reduce the output appropriately, one can omit cooling ducts in such plasma torches.

Figure 6:
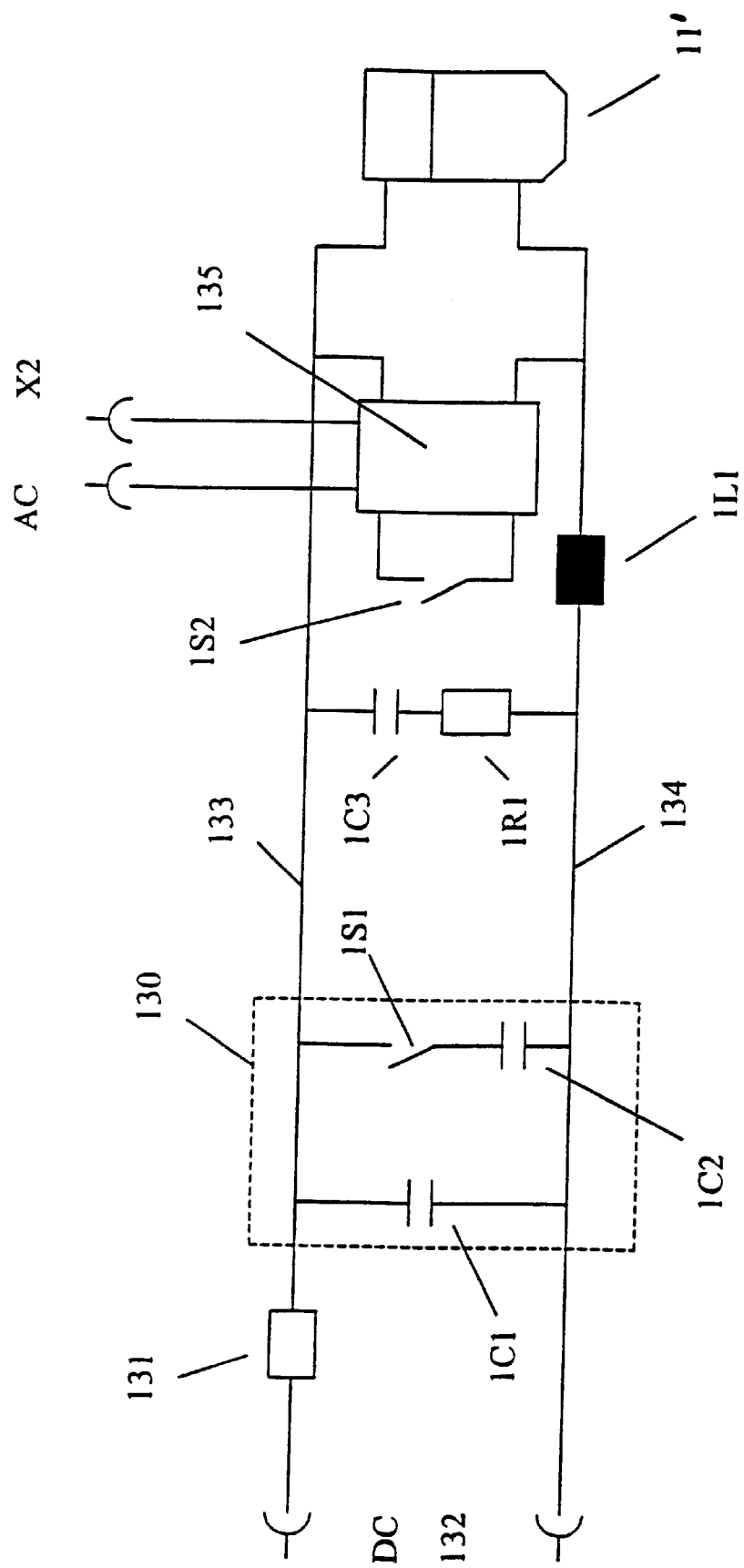
FIG. 6 shows a first embodiment of a voltage supply for a plasma torch.

FIG. 6 shows a voltage supply for a plasma torch 11' in accordance with FIGS. 1 to 5, with the voltage supply being provided for the production of a pulse plasma.

A capacitor battery 130 is connected by way of a charging resistor 131 with the connections X1 of a controllable DC voltage source 132. The capacitor battery 130 is provided with a fixedly connected capacitor 1C1 and a capacitor 1C2 which is connectable parallel to the same through a switch 1S1. Groups of capacitors can be concerned in both cases.

Said capacitor battery 130 is connected through connecting lines 133, 134 with the cathode and anode of plasma torch 22 (not illustrated in FIG. 6).

An RC module is switched in parallel to the capacitor battery 130 which is formed by a capacitor 1C3 and a resistor 1R1. This RC module forms an HF block circuit in conjunction with a choke 1L1 switched in the connecting line 134, which choke is provided for the protection of the capacitor battery 130 against HF signals.

The outputs of an ignition set 135 are further connected to the connecting lines 133, 134. Said ignition set 135 is connected on the input side with an AC voltage source X2 and provided with a trigger switch 1S2 by which an ignition pulse can be initiated when actuated.

During operation, the capacitor battery 130 is charged according to the set voltage of the DC voltage source 132 which is adjustable between 50V and 300V and the time constant which is co-determined by the capacity of the capacitor battery 130 and the line resistances and the charging resistance.

Once the capacitor battery 130 reaches a voltage which corresponds to the arc-over voltage of the anode-to-cathode gap 15', 19' of the plasma torch 11', an ignition of an arc between anode 15' and cathode 19' (FIG. 1, FIG. 3) and thus the formation of plasma in the orifice zone of the anode 15' of the plasma torch 11' will occur.

At the same time the capacitor battery 130 will discharge according to the time constant given by its capacity, the line resistances and the resistance of the arc. If as a result of this discharge the voltage of the capacitor battery 130 drops below the arc drop voltage, the same goes out and the capacitor battery 130 charges up again, as a result of which the described process is repeated and a frequency is obtained which is determined by the charging and discharging time constants. The operation of the ignition set is not required.

For certain applications it can be desirable to determine the ignition time of the arc precisely or to initiate such a one prior to reaching the arc-over voltage of the anode-to-cathode gap 15', 19' in order to enable the production of particularly short plasma pulses.

In this case an ignition pulse is initiated by actuating the trigger switch 1S2 which leads to the ignition of an arc between the anode 15' and the cathode 19' of the plasma torch 11' without the capacitor battery 130 having reached a voltage corresponding to the arc-over voltage of this gap. In this way the pulse-duty factor, which can be selected between 1:10 and 1:100 and even beyond this figure, can be changed respectively and the ratio between the arc duration and its pause during a cycle can be changed in the sense of an extension of the arc pause, since the energy of the high-frequency ignition pulses of the ignition set 135 is sufficient for igniting the arc, but not for maintaining the same when the voltage of the capacitor battery 130 drops below the arc drop voltage.

Figure 7:
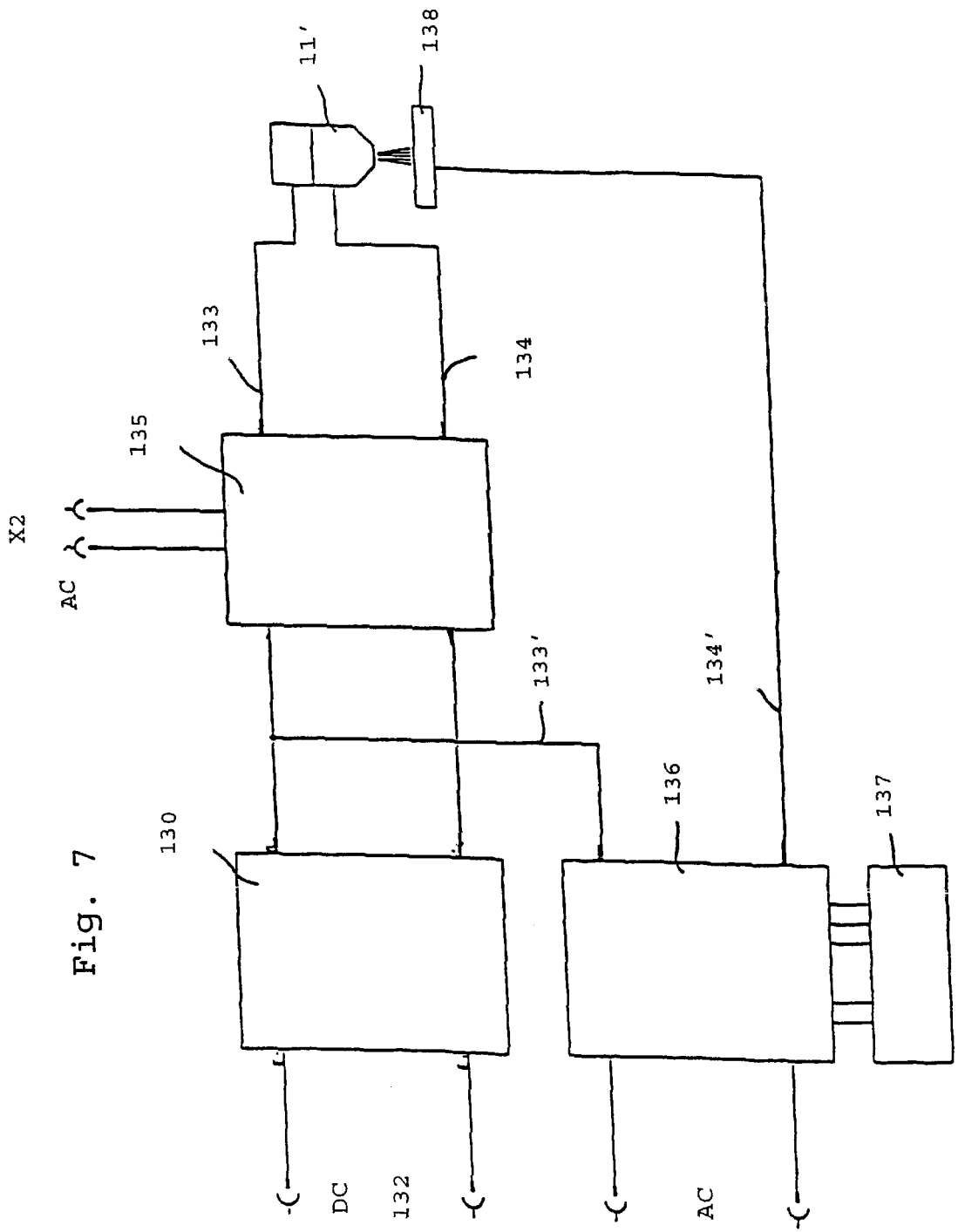
FIG. 7 shows a further embodiment of a voltage supply for a plasma torch.

The embodiment of the voltage supply for the plasma torch 11' in accordance with FIG. 7 is distinguished from the one in accordance with FIG. 6 only in the respect that a mains apparatus 136 is provided in addition to the capacitor battery 130, which mains apparatus is connected to an AC voltage network and is provided with a rectifier circuit. The illustration of the blocking circuit and the choke was omitted.

The connecting line 133', which is connected with the negative pole of the output of the mains apparatus, is connected to the connecting line 133 which is connected to the negative pole of the capacitor battery 130 and the connecting line 134', which is connected to the positive pole of the mains apparatus 136, is connected with a subject 138.

An automatic current controller 137 is further connected to mains apparatus 136.

In operation the mains apparatus 136 will also supply current to plasma torch 11' once an arc has been ignited between anode 15' and cathode 19', with the electric circuit for the mains apparatus being closed through cathode 19' of the plasma torch, the plasma and the subject 138 as well as the connecting lines 133', 133, 134'.

As soon as the arc in the plasma torch 11' goes out because of the drop of the voltage of the capacitor battery 130 below the arc drop voltage, the electric circuit for the mains apparatus 136 is also interrupted, as its output voltage is not sufficient to maintain an arc between the cathode and the subject 138.

A pulse plasma is also used in a voltage supply pursuant to FIG. 7.

What is claimed is:

1. A method of joining objects by a weld seam formed from a number of welding spots, which comprises the steps of charging one side of the objects with successive plasma pulses ignited between two electrodes, each plasma pulse being produced by applying a voltage pulse exceeding the arc-over voltage between the electrodes to produce each welding spot, the electrodes being kept at a constant distance from the one side of the objects, moving the objects with respect to the electrodes and providing a repetition frequency of the plasma pulses of 5 to 100 Hz.

2. The method of claim 1, wherein the objects are charged in a protective gas atmosphere.

3. The method of claim 1, wherein each plasma pulse has a duration of approximately $10^{-5}$ to 10 seconds.

* * * * *